United States Patent [19]

Ripberger et al.

[11] Patent Number: 4,534,274

[45] Date of Patent: Aug. 13, 1985

[54] PISTON ASSEMBLY FOR INTERNAL COMBUSTION ENGINES

[75] Inventors: Emil Ripberger, Remseck; Gotthard Stuska, Fellbach, both of Fed. Rep. of Germany

[73] Assignee: Mahle GmbH, Stuttgart, Fed. Rep. of Germany

[21] Appl. No.: 477,681

[22] Filed: Mar. 22, 1983

[30] Foreign Application Priority Data

Mar. 29, 1982 [DE] Fed. Rep. of Germany ....... 3211472

[51] Int. Cl.³ .............................. F16J 1/02; F16J 1/16
[52] U.S. Cl. ................................... 92/187; 123/193 P; 403/150
[58] Field of Search ............................ 92/187, 188–191, 92/238; 123/193 P; 403/150, 151, 152, 153, 154, 155; 308/2 R

[56] References Cited

U.S. PATENT DOCUMENTS

| | | | |
|---|---|---|---|
| 913,785 | 3/1909 | Van Auken | 403/154 |
| 1,841,764 | 1/1932 | Solver | 403/39 |
| 3,023,060 | 2/1962 | Pachernegg | 403/150 X |
| 3,402,643 | 9/1968 | Maat | 92/187 |
| 3,473,209 | 10/1969 | Packard et al. | 92/187 X |

FOREIGN PATENT DOCUMENTS 851322 10/1960 United Kingdom.

Primary Examiner—Irwin C. Cohen
Attorney, Agent, or Firm—Murray, Whisenhunt and Ferguson

[57] ABSTRACT

In connection with a plunger piston for internal combustion engines, the connecting rod, which is hinged thereto via a gudgeon pin, is laterally guided at its small end by being in abutting contact with the internal faces of the gudgeon pin bosses. For this purpose, there are provided, only in the zone at the level of the gudgeon pin axis, limited contact surfaces between the connecting rod small end and the gudgeon pin bosses. By this means, the influence of deformations of the piston on the guidance of the connecting rod is eliminated to a very large extent.

2 Claims, 4 Drawing Figures 4,534,274

PISTON ASSEMBLY FOR INTERNAL COMBUSTION ENGINES

BACKGROUND TO THE INVENTION

This invention relates to a piston assembly for internal combustion engines which is provided with means for the lateral guidance of the connecting rod in the piston. More particularly the piston assembly is of the kind having a connecting rod which is hinged by way of a gudgeon pin, which rod is guided at its little end by gudgeon pin bosses disposed on each side of the little end which is engaged on both external planar surfaces over a limited area thereof.

STATEMENT OF PRIOR ART

Such pistons are known from British Patent Specification No. 851,322 and U.S. Pat. No. 3,402,643. Therein, the connecting rod is guided, along the inside of the gudgeon pin bosses, only in the upper zone of the bosses. A guidance (or axial limitation along the gudgeon pin) of the connecting rod only over a partial zone of the external planar surfaces of the little end of the gudgeon pin has the advantage that inaccuracies in the parallelism of the internal surfaces of the bosses for the guidance of the connecting rod become apparent to a lesser extent than would be the case if the connecting rod little end surfaces were in contact with the entire circumferential surfaces of the gudgeon pin bosses. However, the guidance of the connecting rod only in the zenith zone of the internal faces of the gudgeon pin bosses is still affected to a relatively marked extent by mechanically and thermally caused deformations of the piston.

OBJECT OF THE INVENTION

Starting out from this situation, the object underlying the invention is to make the connecting rod guidance still more independent of such deformations of the piston.

SUMMARY OF THE INVENTION

According to the invention there is provided a piston assembly for internal combustion engines, comprising:
(a) a piston having a crown and skirt;
(b) gudgeon pin bosses within said skirt provided with coaxial bores for receiving a gudgeon pin;
(c) a connecting rod of which the little end has surfaces spaced respectively from the gudgeon pin boss surfaces; and
(d) abutment means on both surfaces of at least one of the group comprising said little end surfaces and said boss surfaces, said abutment means being in the form of raised planar sliding surfaces protruding in the direction of the axis of the bores, said raised planar surfaces being disposed one on each side of a central vertical plane containing the longitudinal axis of the piston and the axis of the gudgeon pin bores and extending over a maximum angular dimension of 90 degrees relative to said axis but not extending over an angular dimension of more than 60 degrees on either of the two sides of a plane which contains the axis of the bores and is disposed at right angles to the longitudinal axis of the piston, the other of said group comprising planar annular surfaces against which said raised planar surfaces abut and slide.

The reduced sliding surface may not be provided on the internal surface of the bosses but instead on the connecting rod. As regards the effect, the two solutions are however alike, at least in principle.

BRIEF DESCRIPTION OF DRAWINGS

The invention will now be described by way of examples with reference to the accompanying drawings in which.

DESCRIPTION OF PREFERRED EMBODIMENTS

Figure 1:
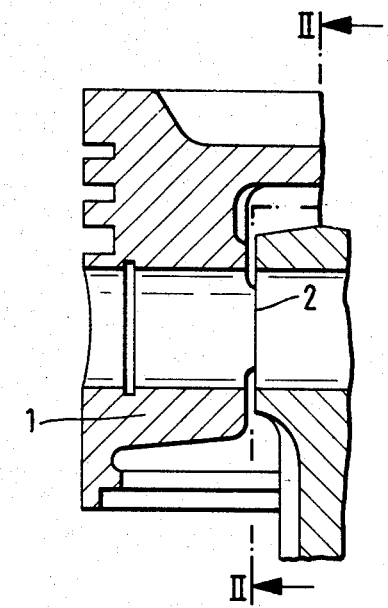
FIG. 1 shows a part section through a piston and little end of a connecting rod of one embodiment.
Figure 2:
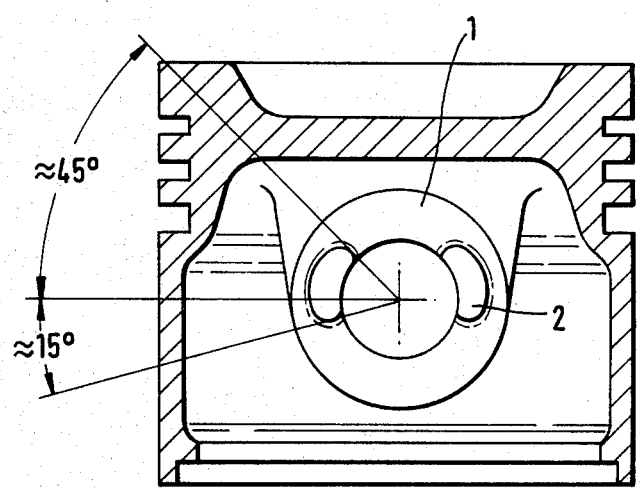
FIG. 2 shows a section taken along the line II—II of FIG. 1.

In the construction shown in the drawings, the external planar surfaces of the connecting rod engages the raised surfaces 2 which have been integrally formed with the gudgeon pin boss 1. The surfaces 2 extend, viewed from the gudgeon pin axis, through 45° in the direction of the piston crown and through 15° in the direction of the piston.

Figure 3:
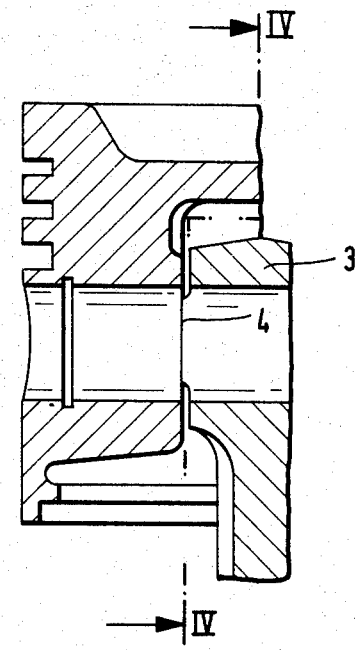
FIG. 3 shows a part section through a piston and little end of a connecting rod of a further embodiment.
Figure 4:
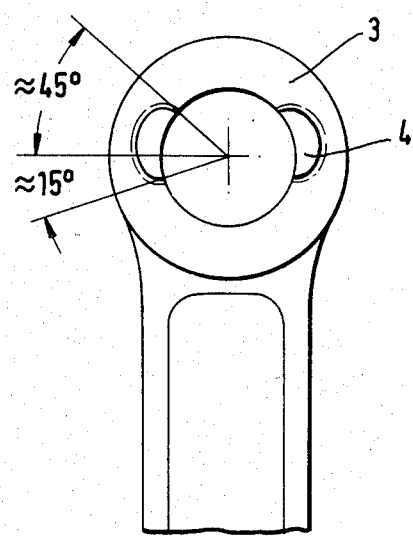
FIG. 4 shows a view of the little end in the direction of arrows IV—IV in FIG. 3.

In the example shown in FIGS. 3 and 4, the partial sliding surfaces have been integrally formed with the disc surface of connecting rod little end 3, as zones 4. However, the dimensions are in accordance with those of the first example.

Due to the guidance of the connecting rod in the zone which is situated, according to the invention, beneath the boss zenith, the temperatures are lower and relatively uniform, whereby the lubricating conditions are also improved.

We claim:

1. A piston assembly for internal combustion engines, comprising
(a) a piston having a crown and skirt, said piston having a longitudinal axis;
(b) a pair of gudgeon pin bosses within said skirt, each of said bosses having a bore therethrough, each of said bores disposed on a common axis, said bores coaxially receivable of a gudgeon pin having an axis, said bosses being spaced apart from one another, each of said bosses having a gudgeon pin boss surface disposed about said bore and facing the other boss;
(c) a connecting rod having a little end, said little end receivable between said pair of gudgeon pin bosses, said little end having a bore therethrough receivable of said gudgeon pin, said little end having a pair of annular planar surfaces, each annular planar surface facing toward and spaced apart from a respective gudgeon pin boss surface;
(d) abutment means on said gudgeon pin boss surfaces, adjacent said annular planar surfaces, for sliding engagement against said annular planar surfaces, said abutment means comprising a pair of raised planar sliding surfaces on each of said gudgeon pin boss surfaces protruding in the direction of said common axis of the bores, said pair of raised planar surfaces being disposed one on each side of a central vertical plane containing said longitudinal axis and said common axis, said pair of raised planar surfaces each intersecting a horizontal plane containing said common axis, each of said pair of raised planar surfaces extending over an angular dimension, about said common axis, of about 45° above said horizontal plane and about 15° below said horizontal plane.

2. A piston assembly for internal combustion engines, comprising
   (a) a piston having a crown and skirt, said piston having a longitudinal axis;
   (b) a pair of gudgeon pin bosses within said skirt, each of said bosses having a bore therethrough, each of said bores disposed on a common axis, said bores coaxially receivable of a gudgeon pin having an axis, said bosses being spaced apart from one another, each of said bosses having a planar gudgeon pin boss surface disposed about said bore and facing the other boss;
   (c) a connecting rod having a little end, said little end receivable between said pair of gudgeon pin bosses, said little end having a bore therethrough receivable of said gudgeon pin, said little end having a pair of annular surfaces, each annular surface facing toward and spaced apart from a respective planar gudgeon pin boss surface;
   (d) abutment means on said annular surfaces, adjacent said planar gudgeon pin boss surfaces, for sliding engagement against said planar gudgeon pin boss surfaces, said abutment means comprising a pair of raised planar sliding surfaces on each of said annular surfaces protruding in the direction of said common axis of the bores, said pair of raised planar surfaces being disposed one on each side of a central vertical plane containing said longitudinal axis and said common axis, said pair of raised planar surfaces each intersecting a horizontal plane containing said common axis, each of said pair of raised planar surfaces extending over an angular dimension, about said common axis, of about 45° above said horizontal plane and about 15° below said horizontal plane.

* * * * *